United States Patent Office 2,806,028
Patented Sept. 10, 1957

2,806,028

3,12-DIOXYGENATED 12a-AZA-C-HOMOSPIROSTANS

Robert H. Mazur, Evanston, Ill., assignor to G. D. Searle & Co., Chicago, Ill., a corporation of Delaware No Drawing. Application July 2, 1956,
Serial No. 595,103

5 Claims. (Cl. 260—239.3)

This invention relates to 3,12-dioxygenated 12a-aza-C-homospirostans and processes for the manufacture thereof. More particularly, this invention relates to compounds of the formula

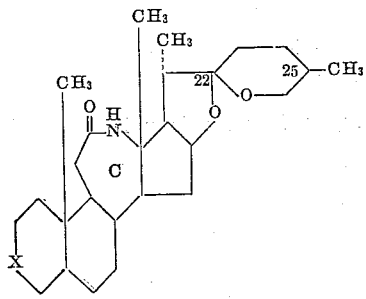

wherein X is a hydroxymethylene (lower alkanoyl)oxymethylene, or carbonyl radical; and the representation of structure at and about the carbon atoms in positions 22 and 25 is without stereochemical significance.

The lower alkanoyl radicals contemplated in the foregoing structural formula are defined by the expression

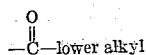

wherein the lower alkyl radicals comprehended are methyl, ethyl, propyl, isopropyl, butyl, isobutyl, secondary butyl, tertiary butyl, pentyl, secondary normal pentyl, primary isopentyl, secondary isopentyl, tertiary pentyl, hexyl, and similar $C_nH_{2n+1}$ radicals such that $n$ is a positive integer amounting to less than 7.

Nomenclature of the compounds herein disclosed is based on recommendations to the International Union of Pure and Applied Chemistry by its Commission on Biological Nomenclature, a report of which is published in the June 23, 1951, issue of Chemistry and Industry.

The subject compounds are useful because of their valuable pharmacological properties. Especially, the claimed compounds provide a desirable anti-hormonal activity. Thus, for example, when administered conjointly with cortisone, they inhibit the harmful deposition of liver glycogen brought about by this widely accepted medicament—apparently without adversely effecting its therapeutic function.

The compounds to which this invention relates are relatively insoluble in water, but may be dissolved in one or more of such common organic solvents as alcohol, ethyl acetate, chloroform, and dioxane. The compounds may be administered in solid form as tablets; dissolved or suspended in aqueous media, they may be given parenterally.

Manufacture of the compounds of this invention is accomplished by contacting an appropriate 3,12-dioxygenated spirostan—for example, hecogenin acetate—with hydroxylamine to produce the corresponding oxime. This material, in turn, is subjected to Beckmann rearrangement in the presence of an acidic reagent (treatment with p-toluenesulfonyl chloride in dry pyridine is one preferred procedure) to give a 3-acetoxy compound defined by the claims. Preferably alkaline hydrolysis—for example, using aqueous alcoholic caustic potash—leads to the "parent" alcohol, which then may be esterified ad libitum in accordance with usual techniques—acid anhydride plus pyridine, or acid chloride and carbon tetrachloride—to provide a selected ester of the invention. Alternatively, the alcohol aforesaid may be oxidized to the corresponding claimed ketone using, for example, chromic oxide in acetic acid.

The following examples describe in detail certain of the compounds illustrative of this invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.) and relative amounts of materials in parts by weight, except as otherwise noted.

EXAMPLE 1

*3β-acetoxy-5α-spirostan-12-one oxime.*—A solution of 20 parts of hecogenin acetate and 4 parts of hydroxylamine hydrochloride in 200 parts of pyridine is heated at reflux temperatures for 2 hours. The reactants are then dumped into a large volume of water, precipitating 3β-acetoxy-5α-spirostan-12-one oxime. The product is filtered out and crystallized from a mixture of alcohol and chloroform as transparent plates, melting at approximately 312° C. The product has the formula

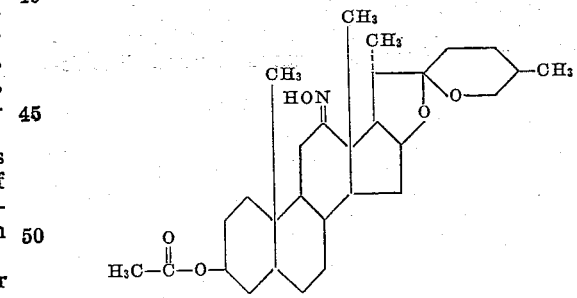

EXAMPLE 2

*3β - acetoxy-12a-aza-C-homo-5α-spirostan-12-one.* — A solution consisting of 10 parts of the oxime of Example 1 and 10 parts of p-toluenesulfonyl chloride in 100 parts of dry pyridine is heated at approximately 90° C. for 3 hours. The solution is then cooled, treated with 10 parts of water, and let stand for 1 hour to permit decomposition of excess acid chloride. Chloroform is next added, and the organic phase washed first with dilute muriatic acid (to remove pyridine) and then with dilute aqueous sodium bicarbonate. Finally, the organic phase is dried over anhydrous sodium sulfate and subsequently stripped of solvent by vacuum distillation. The residue is chromatographed on silica gel, using benzene and ethyl acetate as developing solvents. Recrystallization of the purified product thus obtained from 50% aqueous alcohol affords 3β-acetoxy-12a-aza-C-homo-5α-spirostan-12-one as long, flat prisms having a double melting point at 190° and 230–231° C., with resolidification thereinbetween. The product has the formula

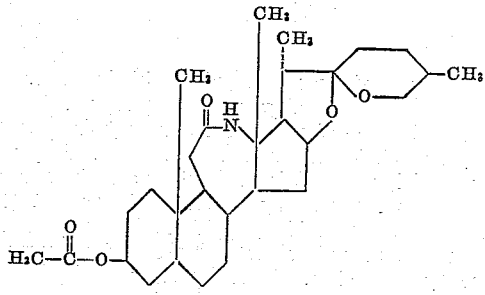

EXAMPLE 3

*12a-aza-3β-hydroxy-C-homo-5α-spirostan-12-one.* — A solution of 10 parts of 3β-acetoxy-12a-aza-C-homo-5α-spirostan-12-one in 100 parts of alcohol containing 10 parts of caustic potash and 10 parts of water is allowed to stand at room temperature for 3 hours. The solution is then neutralized with acetic acid, diluted with 100 parts of water, and concentrated under reduced pressure at approximately 90° C. until crystallization begins. 12a-aza-3β-hydroxy-C-homo-5α-spirostan-12-one is thus obtained as thick needles melting at approximately 160° C. The product has the formula

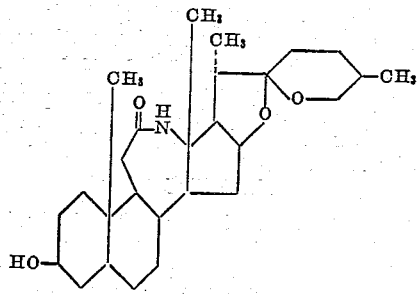

EXAMPLE 4

*12a-aza-C-homo-5α-spirostan-3,12 - dione.*—A mixture of 10 parts of 12a-aza-3β-hydroxy-C-homo-5α-spirostan-12-one and 2 parts of chromic oxide in 20 parts of 90% acetic acid is allowed to stand at room temperatures for 4 hours. The product is isolated by extraction into chloroform, evaporation of the solvent, and crystallization of the residue from 40% aqueous alcohol. The desired 12a-aza-C-homo-5α-spirostan-3,12-dione is thus obtained at transparent blades melting at 236–238° C. The product has the formula

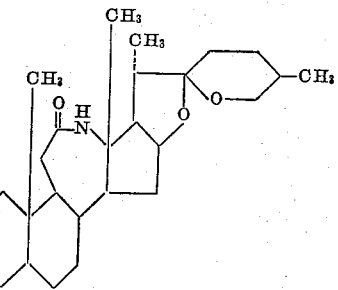

What is claimed is:
1. A compound of the formula

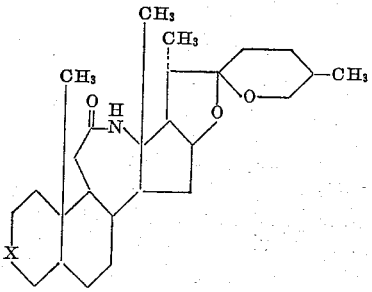

wherein X is selected from the group consisting of hydroxymethylene, (lower alkanoyl)oxymethylene, and carbonyl radicals.

2. A compound of the formula

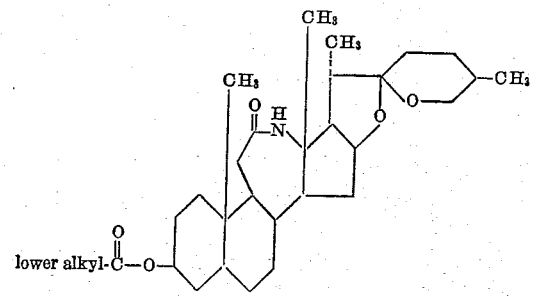

3. 3β-acetoxy-12a-aza-C-homo-5α-spirostan-12-one.
4. 12a-aza-3β-hydroxy-C-homo-5α-spirostan-12-one.
5. 12a-aza-C-homo-5α-spirostan-3,12-dione.

No references cited.